[19] United States Patent
Bright et al.

[11] 3,764,161
[45] Oct. 9, 1973

[54] SEAT BELT ASSEMBLY
[75] Inventors: Rinehart S. Bright, Bloomfield Hills; Charles C. Miles, Detroit, both of Mich.
[73] Assignee: Chrysler Corporation, Highland Park, Mich.
[22] Filed: July 16, 1971
[21] Appl. No.: 163,186

[52] U.S. Cl. .......... 280/150 SB, 297/388, 180/82 C
[51] Int. Cl. ............................................ B60r 21/10
[58] Field of Search ............... 280/150 SB; 297/388; 180/82 C, 111, 112, 113; 242/107 SB

[56] References Cited
UNITED STATES PATENTS
2,937,882  5/1960  Oppenheim .................. 297/388 X
3,411,602  11/1968  Royce ...................... 280/150 SB X
3,506,083  4/1970  Botnick et al. ............. 280/150 SB X
2,799,154  7/1957  Beal ......................... 180/82.2 X
3,692,328  9/1972  Arlauskas et al. ............ 280/150 SB Primary Examiner—Kenneth H. Betts
Assistant Examiner—David M. Mitchell
Attorney—George W. Talburtt et al.

[57] ABSTRACT

A retractable seat belt assembly having a seat belt with a first portion anchored on one side of the vehicle seat and a second portion secured to a retractor mounted on the vehicle door adjacent the seat whereby an intermediate portion of the seat belt may be continuously disposed across a portion of the vehicle seat in an opened or closed position of the vehicle door. The door mounted retractor for paying out and retracting the seat belt has a webbing locking means which is responsive to the operation of the door latch mechanism of the door on which the retractor is mounted.

2 Claims, 6 Drawing Figures

PATENTED OCT 9 1973 3,764,161
SHEET 1 OF 2
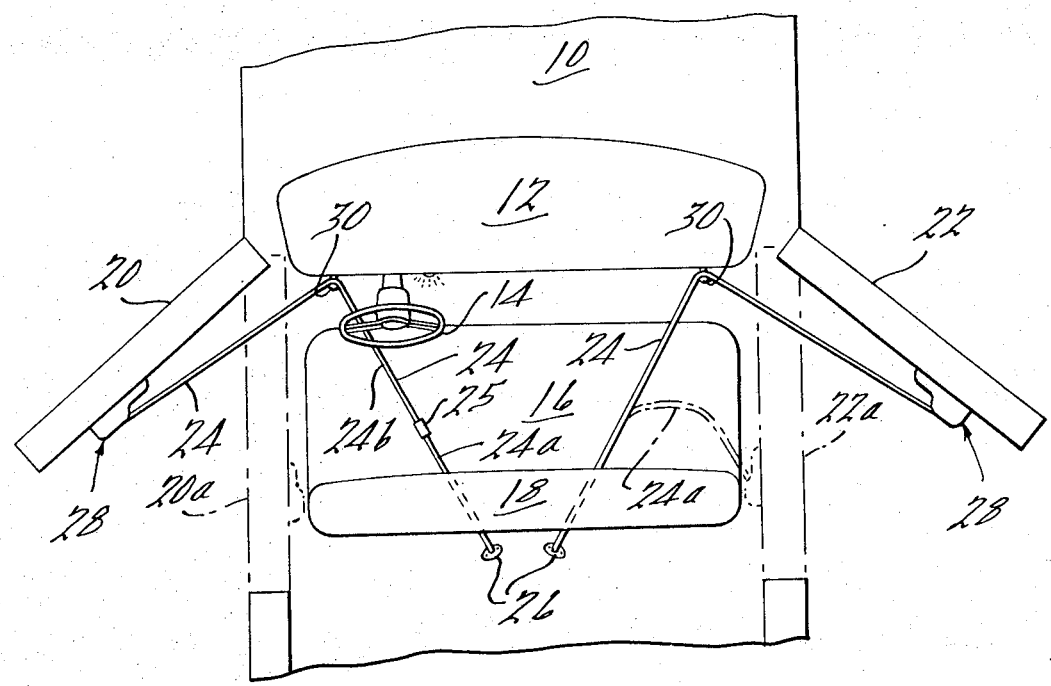
Fig. 1.
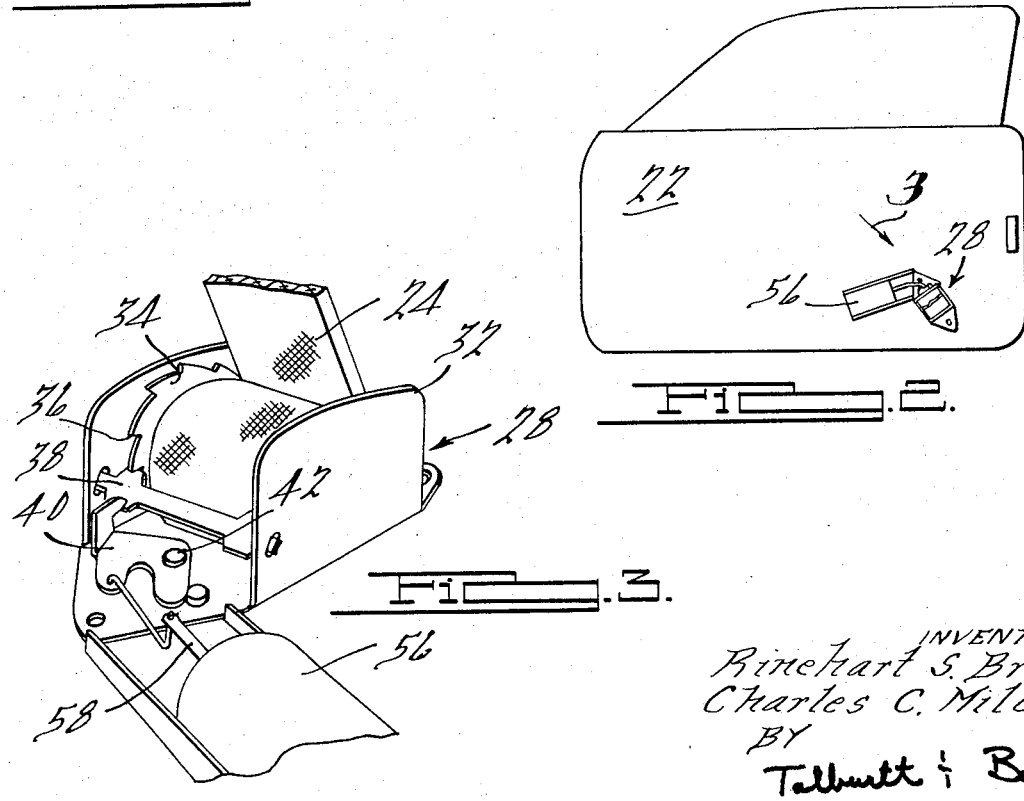
Fig. 2.
Fig. 3.
INVENTORS,
Rinehart S. Bright
Charles C. Miles.
BY
Talburtt & Baldwin
ATTORNEYS.

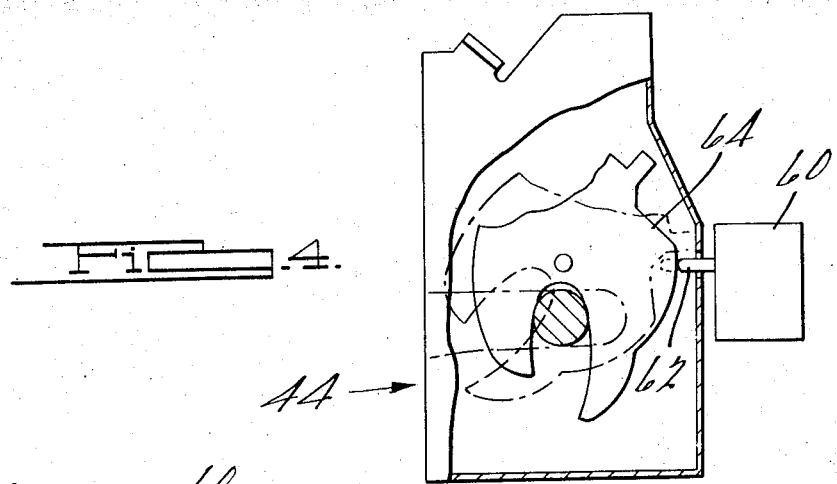
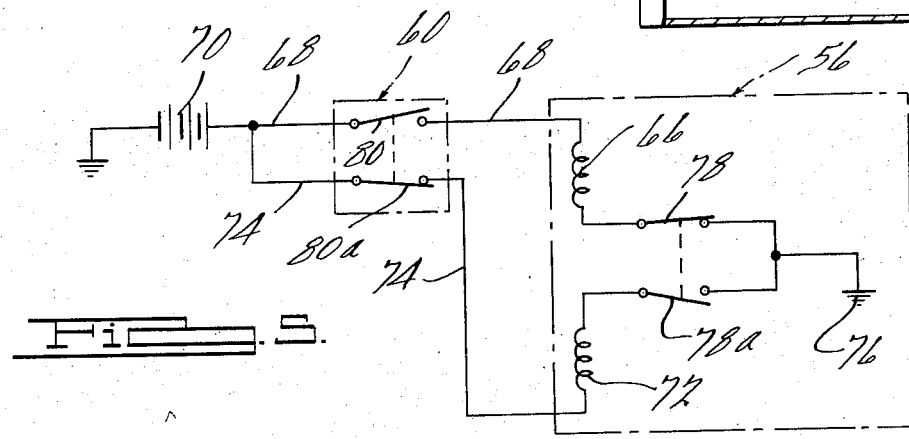
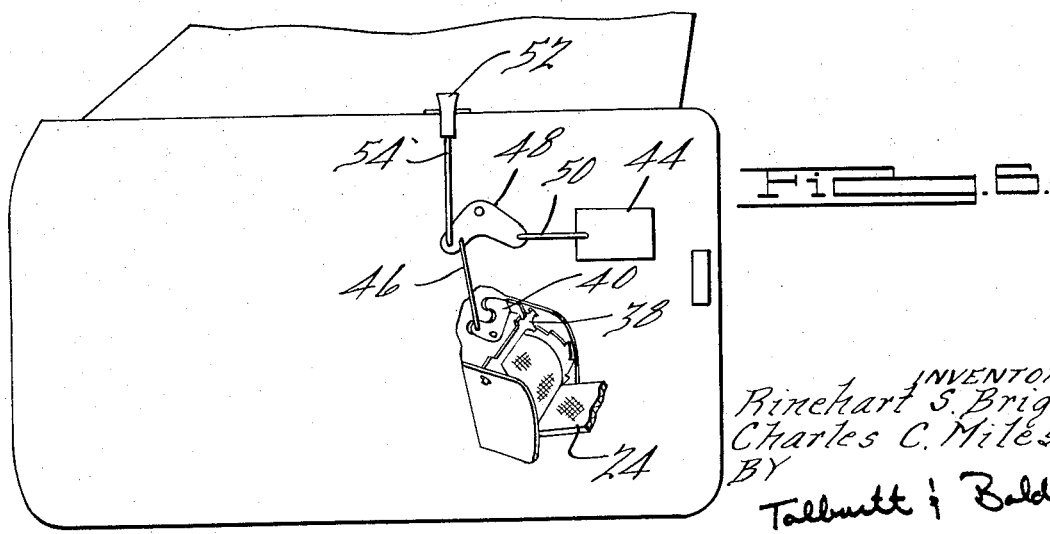

SEAT BELT ASSEMBLY

BACKGROUND OF THE INVENTION

This invention relates to a safety or seat belt assembly having advantageous features for rendering the seat belt more convenient to use. Thus, in recent years experience has shown that proper use of seat belts provides substantially increased protection for vehicle occupants; at the same time, however, it is also known that the public has exhibited great reluctance to using seat belts, such reluctance allegedly being due to the inconvenience associated therewith.

In order to overcome any inconvenience which might be associated with the use of seat belts, it has been proposed to employ an arrangement in which one end of the seat belt secures at one side of a seat position and the opposite end portion is attached in an extensible manner to the vehicle door. Upon opening of the door, the belt will be caused to move away from the vehicle occupant permitting entrance and egress from the seat without the necessity of disconnecting or unbuckling the seat belt. Similarly, upon occupying the vehicle seat and closing the door, the belt is automatically positioned around, and tightens about the occupant by virtue of the belt winding upon a device such as a seat belt retractor.

While the above arrangement is generally advantageous, difficulties have been encountered in controlling operation of the door mounted retractor. Obviously, the retractor locking mechanism for securing the belt in an operative position must function to permit the seat belt webbing to freely wind and unwind during closing and opening of the vehicle door. However, once the occupant has occupied the seat and closed the door, the retractor must function to lock the belt in the extended position it will assume upon encircling the occupant. To effect this control, several arrangements have been suggested such as tying the retractor locking mechanism to the vehicle ignition so that the seat belt webbing will be locked in position when the ignition is on. This arrangement, however, suffers the disadvantage in that the doors of the vehicle cannot be opened unless the ignition is turned off. Obviously, this destroys much of the convenience of the system.

Another retractor locking control heretofore suggested involves making the locking system responsive to vacuum controls which in turn are depended on engine operating conditions. Again, however, such an arrangement has not met acceptance due to the need for sophisticated control to cover situations such as accidental engine stall wherein the seat belt webbing would be released even though such release may not be desirable, or attempting to open a vehicle door, as when picking up or discharging passengers, at a time when the engine is running and thus precluding unwinding of the belt so as to permit opening of the door.

Thus, while seat belt systems are known wherein the belt is connected to a vehicle door and at a location within the vehicle such that the belt will be carried from engagement about a vehicle occupant upon opening of the door, such systems have been costly and subject to various operating difficulties. Moreover, no efficient retractor locking system has been heretofore devised for anchoring the belt or webbing.

SUMMARY OF THE INVENTION

This invention relates to an improved seat belt assembly having the advantage that the user or vehicle occupant does not have to buckle and unbuckle the seat belt during periods of belt usage. With this invention, the seat belt extends over the seat such that the user merely has to guide the belt about him, yet is disposed to permit entrance and egress of the vehicle without substantial manipulation of the seat belt.

In the basic form of the present invention, the seat belt webbing is anchored at one side of a seat position with the other end portion being secured to a retractor located on the vehicle door adjacent the seat. The retractor has a reel portion whereby the belt may be reeled out as the door is opened and automatically retracted as the door is closed. The retractor is provided with a locking pawl which is engageable with the retractor reel so as to prevent the reel from paying out the seat belt webbing. Operation of this locking pawl is responsive to operation of the door latch carried by the door on which the retractor is mounted. Thus, the instant the door latch components move to permit the vehicle door to be opened the retractor lock releases to allow the seat belt webbing to pay out. In one embodiment of the invention, the retractor locking pawl is actuated in response to movement of the locking rod which operates the door latch lock. Thus, for example, when the occupant closes the vehicle door and presses the garnish molding button to lock the door the movement of the locking rod automatically and simultaneously sets the retractor lock so that the seat belt webbing cannot be played out.

In another embodiment of this invention, the retractor locking mechanism comprises a pawl which is moved to and from engagement with the retractor reel by means of an actuator such as a solenoid. Operation of the solenoid is controlled by a switch located adjacent the door latch such that the switch is actuated through contact with a part of the latch which undergoes movement, such as the rotor element. Thus, upon actuation of the door latch by means of either the exterior or interior door handle or through closing of the door, the door latch rotor will move thereby actuating the switch which in turn will actuate the solenoid to move the paw to or from locking engagement with the retractor reel.

From the foregoing, it will be appreciated that the principal advantage of this invention is that operation of the retractor does not require any added steps on the part of the vehicle occupant. The very act of entering or leaving the vehicle will automatically place the seat belt retractor in proper operating condition.

DESCRIPTION OF THE DRAWING

Other features and advantages of the present invention will be made more apparent as this description proceeds, reference being had to the accompanying drawings wherein:

FIG. 1 is a horizontal sectional view of a portion of a motor vehicle equipped with a safety belt system constructed in accordance with this invention, the safety belt being shown in solid lines in the stowage position in which it would be placed upon leaving the vehicle;

FIG. 2 is a side elevational view of a vehicle door showing a door mounted seat belt retractor and solenoid actuator for controlling operation of the retractor;

FIG. 3 is a perspective view of the retractor and solenoid actuator shown in FIG. 2 looking in the direction of the arrow 3;

FIG. 4 is a schematic elevational view of a vehicle door latch and a switch mounted adjacent thereto for cooperation with the latch, with a portion of the latch housing broken away to reveal the latch rotor;

FIG. 5 is a schematic electrical circuit diagram for one embodiment of the invention, and FIG. 6 is a view similar to FIG. 2 showing an alternative embodiment of the invention.

DESCRIPTION OF THE PREFERRED EMBODIMENTS

Referring now to the drawings, and in particular to FIG. 1, there is shown a fragmentary part of a motor vehicle having a hood structure 10, a windshield 12, a steering wheel 14 and a bench seat having a seat portion 16 and a back support 18. The seat is connected to the vehicle floor in conventional manner and it will be appreciated that the seat belt arrangement of this invention can be used with either bench or bucket seats. Vehicle doors 20 and 22 are shown in a solid line open position and a dotted line closed position 20a and 22a, with the doors being attached by conventional hinges to a part of the vehicle structure.

The seat belt assembly of this invention comprises a seat belt 24 which is conventionally anchored 26 at one end portion to the vehicle door behind the seat structure. The seat belt 24 runs forwardly between the seat 16 and back rest 18 and has its other end portion secured in conventional manner to a retractor indicated generally at 28. If desired, the seat belt 24 may consist of two distinct portions 24a and 24b which connect by a conventional buckle 25. This would permit the alternative of conventional seat belt operation if such was desired.

In front hinged doors as shown in FIG. 1, the retractor 28 is mounted, as seen in FIG. 2, on the inside door panel at the lower rear section of the door. Accordingly, as the door is opened from its closed position 22a, the seat belt webbing 24 will be extracted from the retractor 28 and be carried from an occupant encircling position as indicated by the dotted line position 24a to a position which will allow the vehicle occupant to enter or leave his seat position without unbuckling the belt. For convenience, retaining clips 30 can be secured to the vehicle A-pillar or instrument panel such that the seat belt 24 can be placed therein so as to assume the solid line position of FIG. 1. It will be noted that by proper placement of the clip 30 adjacent the steering wheel 14, the seat belt 24 can be made to interfere with the steering wheel thereby ensuring that when in the stowed position, the belt will be removed from the clip and placed about the driver.

The retractor 28 controls play-out and retraction of the seat belt 24 and is of generally conventional construction having a reel rotatably mounted in a housing 32 and around the reel is wound, as seen in FIG. 3, the seat belt webbing 24. The reel has a hub or flange portion 34 at each end thereof which is provided with teeth 36 at the other periphery of the flange. A pawl member 38 is journaled in the housing 32 so as to be selectively engageable upon pivotal movement with the teeth 36 of reel flange members. The pawl is positioned such that it normally will pivot of its own mass to a position where it engages the teeth of the reel. A spring (not shown) normally biases the reel in a direction to cause the seat belt webbing 24 to retract by winding about the reel. With reference to FIG. 3, it will be seen that the teeth 36 and pawl 38 cooperate such that the pawl does not interfere with retraction of the seat belt. However, with the pawl in the position shown, it locks the retractor and prevents pay-out of the seat belt.

It will be appreciated from FIG. 1 that the retractor locking mechanism for controlling winding and unwinding of the seat belt webbing must be actuated when it is desired to open the door so that the webbing can be extracted from the retractor to permit the door to move. Similarly, upon entering the car and closing the door the locking mechanism must engage to secure the seat belt after the retractor spring has retracted the webbing about the occupant.

In order to control operation of the retractor locking mechanism, a novel control system is employed in which the retractor lock is responsive to operation of the vehicle door latch. In one embodiment, as seen with reference to FIG. 6, a retractor pawl release lever 40 (FIG. 3) which is pivotally secured to the retractor housing by means of a pin 42 is interconnected with the lock mechanism of the vehicle door latch 44, with the pawl 38 and pawl release lever 40 comprising the retractor locking means. Thus, the pawl release lever 40 is connected by a rod 46 to a pivot link 48 which, in turn, is connected by a rod 50 to the lock means (not shown) of the door latch 44. A garnish molding button 52 is also connected to the pivot link 48 by a rod 54 and is operable by vehicle passengers to unlock and lock the latch 44. Accordingly, in operation, when the garnish molding button is pulled upward so that the door can be opened, the upward movement of the locking rod 54 will automatically and simultaneously cause the pivot link 48 and rod 46 to pivot the pawl release lever to a position such that the pawl disengages from the reel flange teeth 36. The webbing is then free to be pulled from the retractor by the opening of the door. When entering and taking a seat in the vehicle, the door is closed and the seat belt lifted off the retaining clip 30. The retractor spring will then cause the seat belt to retract about the occupant in the position 24a (FIG. 1). At this point the door can still be opened as the seat belt is free to pay out of the retractor. However, when the door latch is locked by pushing down on the garnish molding button 52, the movement of the locking rod will cause the pawl release lever 40 to disengage from the pawl 38 and allow the pawl to assume its natural position and engage the rod flange teeth 36 thereby locking the seat belt webbing from extraction.

Another embodiment of this invention is shown with reference to FIGS. 3, 4 and 5 wherein an electrical actuator is used to pivot the pawl release lever 40 as described above. Thus, a solenoid 56 is mounted adjacent the retractor 28 and the armature 58 is connected to the pawl release lever 40. Accordingly, movement of the armature will cause the pawl release lever to pivot.

To control operation of the solenoid 56, a switch 60 is disposed adjacent the vehicle door latch 44 and has a plunger 62 which is in engageable relationship with a movable component of the door latch such as the rotor 64. The door latch mechanism itself is not critical to this invention and reference may be had to U. S. Pat. No. 3,409,321 as exemplifying a suitable latch construction. In any event, it will be seen from FIG. 4 that the switch plunger 62 rides against the periphery of the rotor 64 and undergoes axial movement as the rotor pivots from its door open position shown in solid lines to a door latched position in dotted lines due to contact between the rotor and a striker pin carried by the door pillar in conventional manner. Accordingly, in this embodiment of the invention, closing of the vehicle door results in pivoting of the latch rotor 64 with corresponding movement of the switch plunger 62 to close the switch and energize the solenoid 56 thereby properly positioning the pawl release lever 40.

The operational characteristics of the arrangement of this embodiment of the invention may be understood by reference to the schematic circuit diagram of FIG. 5. As shown in this Figure, the solenoid 56 is shown as having a first energizing coil 66 which is in an energizing first circuit comprising conductor 68 which connects one terminal of the coil to a source of electrical potential represented by the vehicle battery 70.

The solenoid 56 is also provided with a second energizing coil 72 which is in a second circuit which is connected to battery 70 by conductor 74. Each of the coils are grounded at 76. Coil 66 is operative to move armature 58 of solenoid 56 in one direction to effect locking of the retractor reel which coil 72 is effective to move armature 58 in the opposite direction to unlock the retractor reel.

An interrupter switch 78 is provided in the solenoid 56 and is actuated between open and closed positions by movement of the solenoid armature 58. In this manner, the coils 66, 72 never oppose each other and current does not constantly drain through the solenoid.

In operation, when the vehicle door is closed the latch rotor pivots through co-action with the striker pin causing contact 80 of switch 60 to close and contact 80a which is ganged with contact 80 to open. Accordingly, current from the battery 70 flows through conductor 68, coil 66, interrupter switch 78 (which is closed when the retractor is unlocked) and to ground 76. The completion of this first circuit energizes coil 66 and causes the solenoid armature 58 to move in a direction such that the pawl release lever 40 allows the pawl 38 to engage the reel teeth 36 thereby locking the retractor. During the final stage of this movement of the solenoid armature 58, the interrupter switch 78 is caused to open, and switch 78a ganged therewith to close, thereby interrupting the flow of current through the coil 66 and de-energizing the solenoid 56.

When the vehicle door is opened, contact 80a is closed thereby energizing solenoid coil 72 which causes the solenoid armature to bring the pawl release lever 40 into engagement with the pawl 38 and lift the pawl from engagement with the retractor reel teeth 36. This unlocking action then permits the seat belt webbing to freely unwind from the retractor. Finally, this movement of the solenoid armature opens switch 78a and closes switch 78.

While the foregoing illustrates and describes what is contemplated to be the best modes for carrying out the invention, the constructions are, of course, subject to modification without departing from the spirit and scope of the invention. Thus, for example, use of the interrupter switches 78, 78a is not essential, although longer solenoid life is obtainable therewith.

We claim:

1. In a motor vehicle, a seat, a door disposed adjacent one side of said vehicle seat, door latch means carried by said door for securing the door in a closed position, said door latch means being provided with a lock mechanism and a locking rod for actuation of the lock mechanism, said locking rod being movable by a vehicle occupant between a lock position and an unlock position, and a seat belt retractor mounted on said door and co-operating with a seat belt to provide for extension and retraction of said belt, said seat belt retractor being provided with retractor seat belt locking means for preventing said seat belt extension, linkage means interconnecting said retractor locking means and said latch lock mechanism whereby said retractor locking means is actuated by operation of said latch lock mechanism.

2. The combination of claim 1 wherein said retractor comprises, a reel, a flexible belt wound on said reel, resilient means biasing said reel to wind the belt thereon, and retractor locking means adjacent said reel for movement into locking engagement with said reel to prevent rotation of said reel in a direction permitting unreeling of said belt said retractor locking means being connected with said locking rod whereby movement of said locking rod to the lock position actuates said retractor locking means to prevent seat belt extension and movement of said locking rod to the unlock position being effective to actuate said retractor locking means to permit seat belt extension and retraction.

* * * * *